United States Patent [19]

McDaid

[11] Patent Number: 5,119,419
[45] Date of Patent: Jun. 2, 1992

[54] LOCKABLE TELEPHONE PLUG APPARATUS

[76] Inventor: Denis McDaid, 25 O'Connor Court, Ballymagroarty, Derry, Ireland

[21] Appl. No.: 453,703

[22] Filed: Dec. 20, 1989

[30] Foreign Application Priority Data

Dec. 29, 1988 [IE] Ireland .................................. 3885/88

[51] Int. Cl.⁵ ....................... H04M 1/00; H01R 13/44
[52] U.S. Cl. ..................... 379/445; 379/438; 439/133
[58] Field of Search ............... 379/445, 438; 439/133, 439/304, 344

[56] References Cited

U.S. PATENT DOCUMENTS

| | | |
|---|---|---|
| 4,047,787 | 9/1977 | Gumb et al. ........................ 439/344 |
| 4,311,883 | 1/1982 | Kidney ............................... 379/443 |
| 4,615,575 | 10/1986 | Kossor ............................... 439/304 |
| 4,708,413 | 11/1987 | Schroeder . | 
| 4,711,511 | 12/1987 | Noorily . |
| 4,870,840 | 10/1989 | Klein ................................. 439/133 |
| 4,893,488 | 1/1990 | Klein ................................. 439/133 |
| 4,911,646 | 3/1990 | Marson et al. ..................... 439/133 |

FOREIGN PATENT DOCUMENTS 2219444 12/1989 United Kingdom ............... 379/445
WO80/02475 11/1980 World Int. Prop. O. .

Primary Examiner—James L. Dwyer
Assistant Examiner—Jason Chan
Attorney, Agent, or Firm—Curtis, Morris & Safford

[57] ABSTRACT

A lockable telephone plug apparatus comprises a shank member for insertion into a line jack unit said shank member having suitable connections for connecting with the electrical connections in the line jack unit. The shank member has a movable locking member mounted thereon and arranged to be in use moved by a locking means to engage a part of the line jack unit socket to prevent removal of the telephone plug apparatus from the line jack unit. The shank member and the locking means are mounted in a housing.

8 Claims, 4 Drawing Sheets

LOCKABLE TELEPHONE PLUG APPARATUS

The present invention relates to a lockable telephone plug apparatus.

SUMMARY OF THE INVENTION

According to the invention there is provided a lockable telephone plug apparatus comprising a shank member for insertion into a line jack unit said shank member having suitable connections for connecting with the electrical connections in the line jack unit, said apparatus further comprising locking means, a pin mounted in the shank member and arranged to be turned by the locking means about the axis of the pin while the shank member remains stationary and a locking part which is carried by the shank member and moved, when the pin is turned appropriately, into a position in which it can engage a part of the line jack unit socket to prevent removal of the telephone plug apparatus from the line jack unit.

An embodiment of the invention will now be described, by way of example, with reference to the accompanying drawings.

DESCRIPTION OF THE PREFERRED EMBODIMENTS

Figure 3:
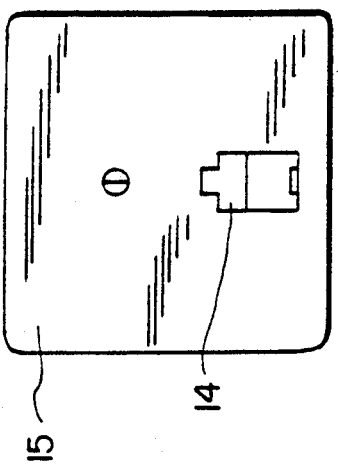
FIG. 3 is a front view of a conventional telephone socket.
Figure 2:
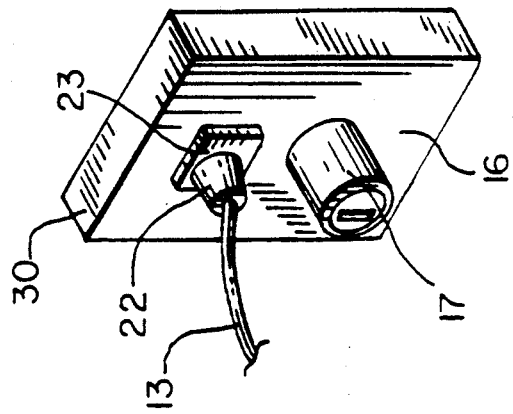
FIG. 2 is a front view of the housing of the apparatus of FIG. 1.
Figure 1:
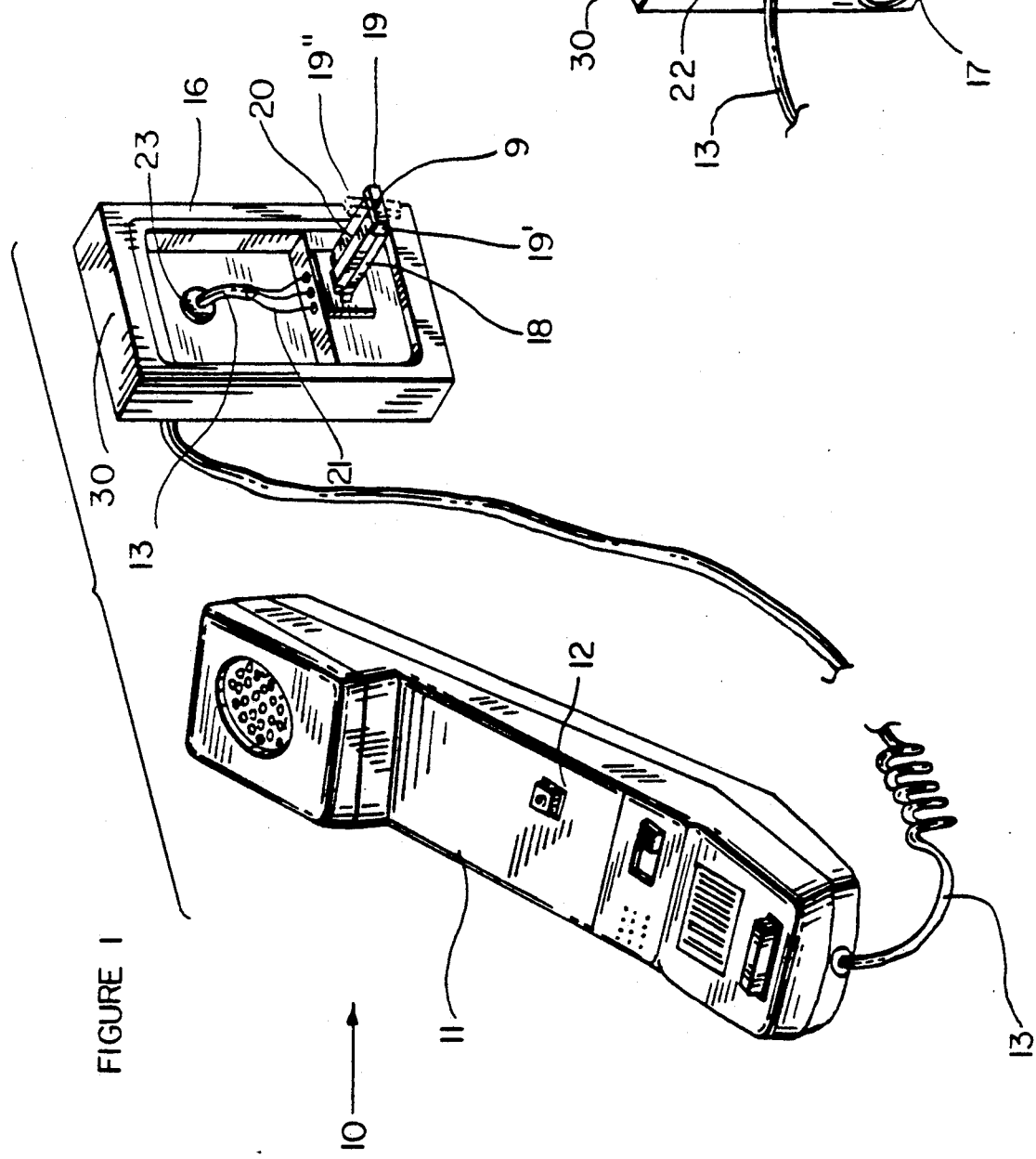
FIG. 1 is a perspective view of one embodiment of a lockable telephone plug apparatus according to the invention.
Figure 4A:
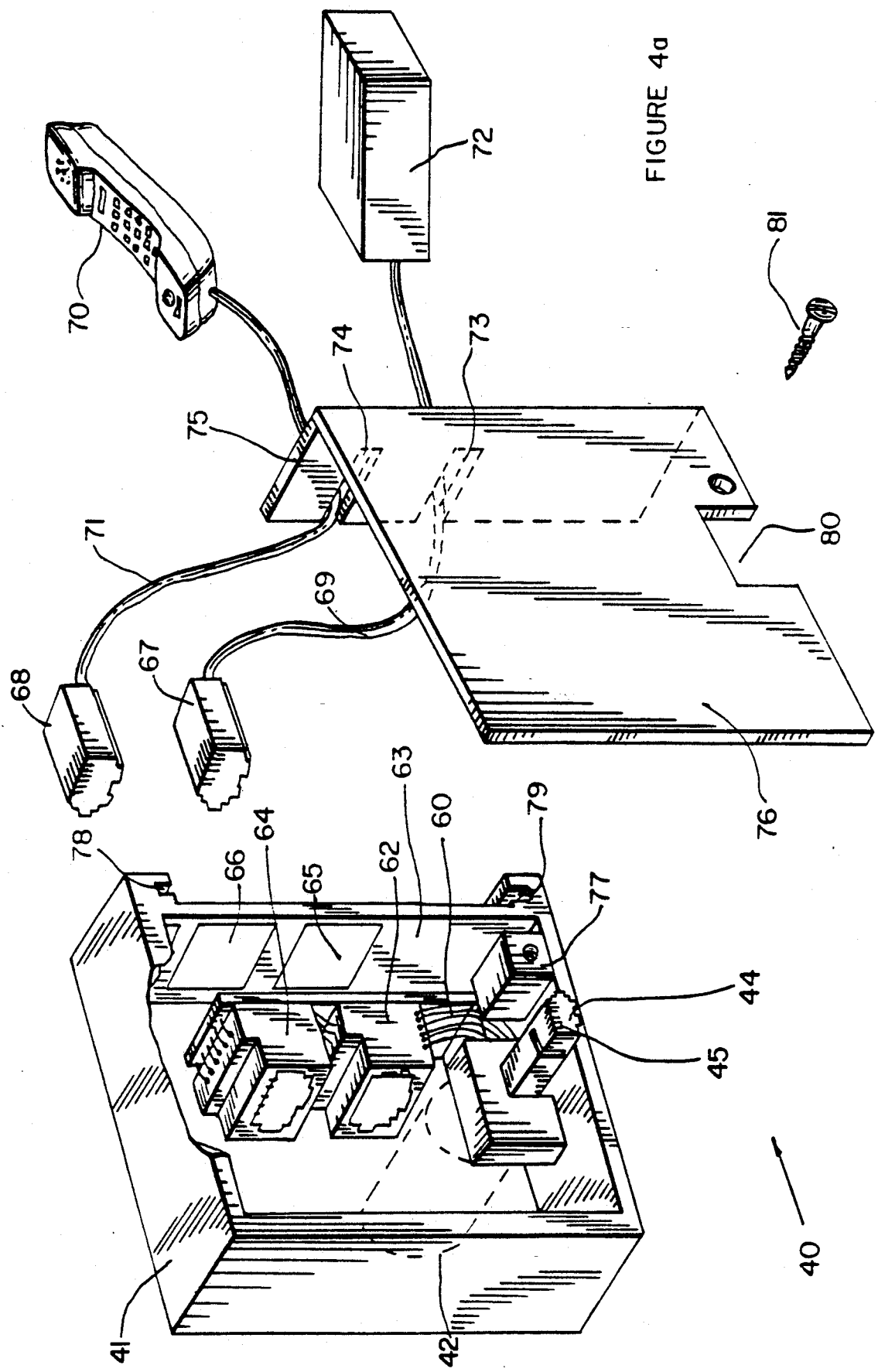
FIG. 4a is an exploded perspective view of another embodiment of lockable telephone plug apparatus according to the invention.
Figure 4B:
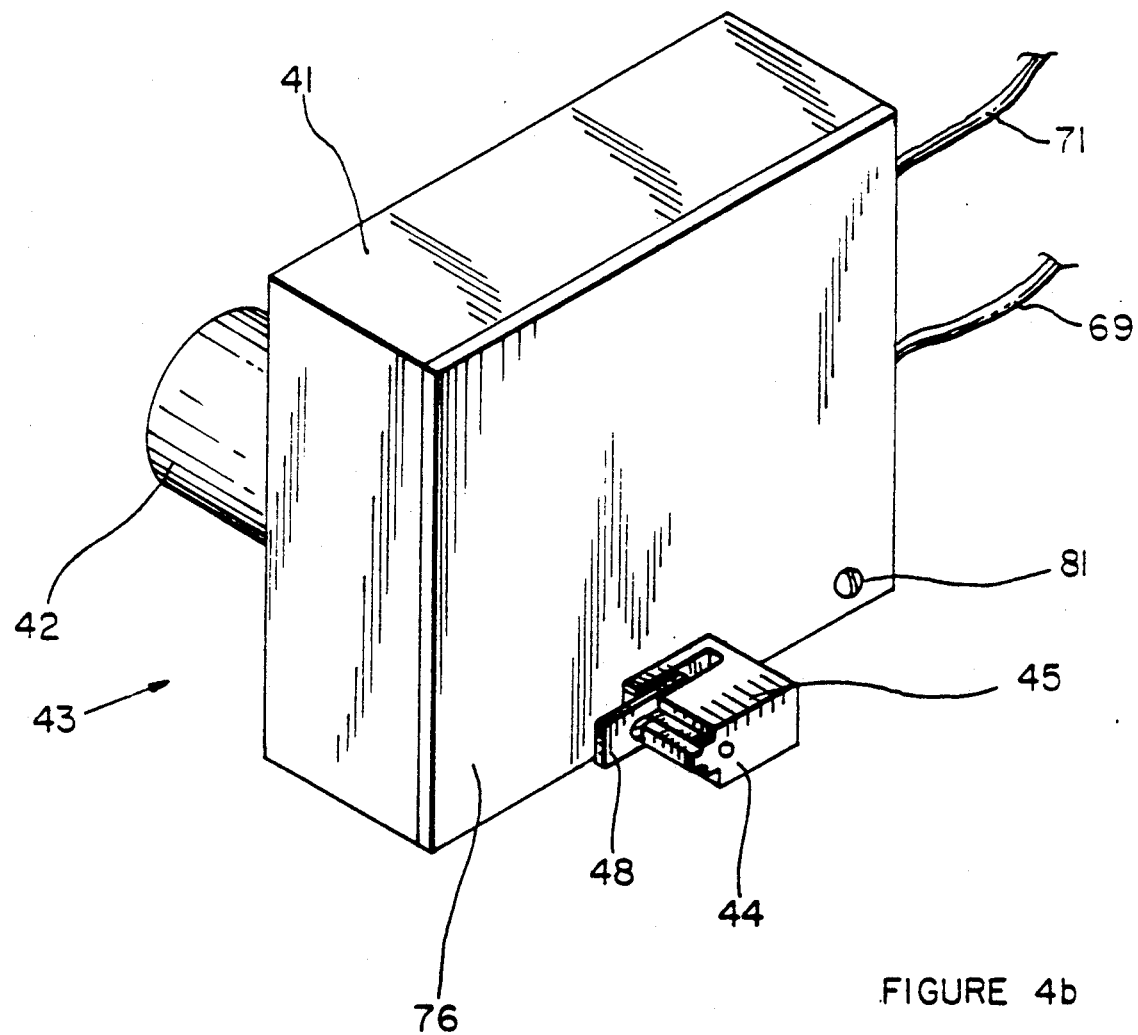
FIG. 4b is a perspective view of the apparatus of FIG. 4a when assembled.

Referring now to the drawings wherein similar numerals have been used to indicate like parts, there is shown therein a lockable telephone plug apparatus generally indicated at 10 according to the invention. The apparatus 10 comprises a plug member 30 including a housing 16 having fixed thereon a key operated barrel lock 17. A shank member 18 is fixed to the lock 17, the shank member 18 projecting through a suitable aperture in the housing 16. The shank member 18 carries a locking element which in this case is a separate member 19 fast with one end of a pin 9 which passes through the shank member 18. The pin 9 is also connected to the operating mechanism of the barrel lock 17 so that upon operation of the lock 17 by a suitable key (not shown) the pin 9 turns about its own axis and the locking member 19 is rotated through 90° from its initial horizontal position shown at 19' to a second or vertical position 19'' as will be described further below.

The shank member 18 is of a suitable size and shape that it can be inserted in locking member 19 foremost in the socket 14 of a conventional telephone socket housing 15. This can be done with the locking member 19 in the horizontal position indicated at 19'. The shank member 18 carries electrical connections 20 similar to and located similarly to those on a conventional telephone plug.

The electrical connections 20 are embedded in the shank member 18 and are connected to the appropriate wires 21 in a lead 13. The lead 13 is fixed in the housing 16 by means of a rubber grommet 22 located in an aperture 23 in the housing 16.

The lead 13 is connected to a digital telephone 11 which has only dial button 12 so that the telephone may receive incoming calls but may only be used to make outgoing emergency calls as for example the conventional "999" emergency call. It will be appreciated however that in some countries the telephone 11 may be required to have more than one button 12 in order to permit an emergency call to be made.

Thus, the housing 16 may be locked to the conventional telephone socket housing 15, with the shank member inserted in the socket 14. In this position with the locking member 19 in the vertical position indicated at 19'', the shank member 18 cannot be removed from the socket 14 as it cannot be removed with the locking member 19 in the vertical position. The locking member 19 engages behind a suitable flange or other structure (not shown) in the socket housing 15.

In use, the normal telephone plug is removed from the socket 14 and the shank member 18 is inserted into the socket 14 in substitution thereof. In this position the wires 21 are connected to the telephone line connections in the telephone socket 14 via the electrical connections 20 in the shank member 18.

In another embodiment of the invention, the telephone 11 may comprise a standard telephone in which all of the dial buttons with the exception of the '9' button (or with the exception of any other suitable combination of buttons) are electrically disconnected so that they cannot be used to make a telephone call.

Figure 5A:
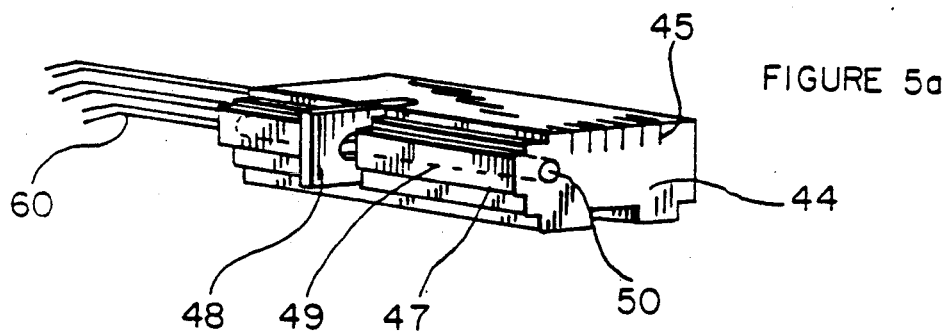
FIGS. 5a and 5b are perspective views of one embodiment the shank member of the apparatus of FIG. 4.
Figure 5B:
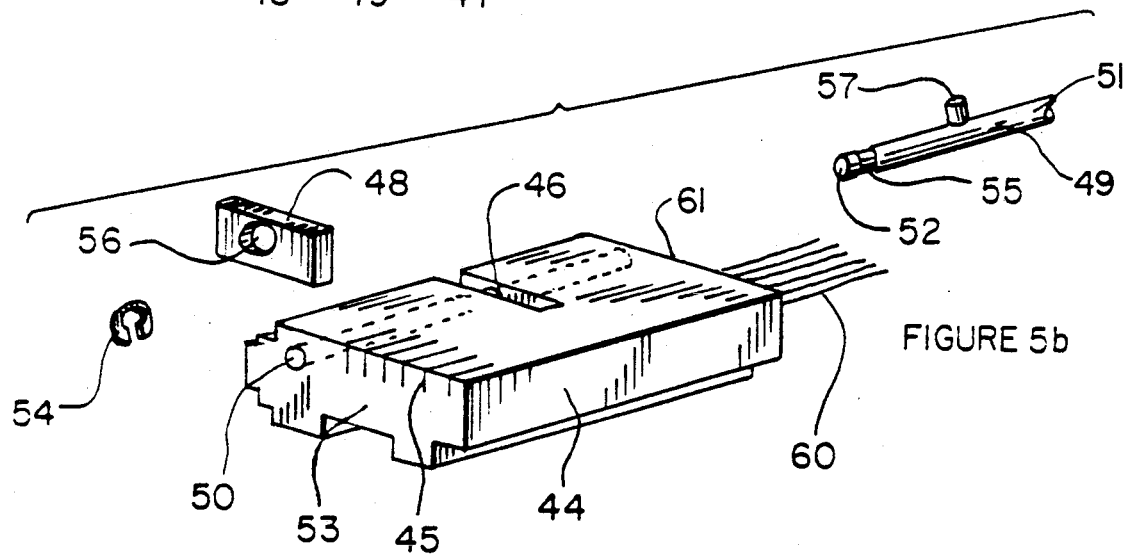

Referring now to FIGS. 4a, 4b, 5a and 5b there is shown another embodiment of lockable telephone plug apparatus generally indicated at 40. The apparatus 40 comprises a housing 41 having a key operated barrel lock 42 fixed to its outer surface 43. A shank member 44 is fixed to the inner surface of the housing 41 and is similar in shape to a conventional telephone line jack plug as shown in FIGS. 5a and 5b. The shank member 44 is thus of a shape corresponding to that of a conventional telephone plug so that it may be readily inserted into a conventional telephone socket 14 (FIG. 3) otherwise known as a line jack unit.

Thus, the shank member 44 has conventional electrical contacts 45 embedded therein in conventional manner for connecting with the electrical connections in the line jack unit. Further, the shank member 44 has a recess 46 disposed on one side 47 which accommodates a locking part in the form of an elongate and longitudinally slidable latch member 48. The latch member 48 is located in position by means of an elongate pin 49 which projects through an aperture 50 in the shank member 44. The end 51 of the pin 49 is operatively connected to the barrel lock 42 and the free end 52 of the pin projects out of the front 53 of the shank member 44 and is held in place by means of a spring clip 54 which engages around a reduced diameter portion 55 of the pin 49. The pin 49 passes through an aperture 56 in the latch member 48 and a cam member 57 is provided on the pin 49 on the portion which passes through the aperture 56. Thus, during rotation of the pin 49 through 180° by the barrel lock 42 the latch member 48 is moved from a position in which it is flush with the side 47 of the shank member 44 to a position in which it projects outwardly at right angles to the side 47 as shown in FIG. 5a.

The electrical contacts 45 are connected to wires 60 which project out of the rear wall 61 of the shank member. It will be appreciated that a suitable space will be provided between that portion of the rear wall 61 from which the wires 60 emerge and the inner surface of the housing 41. Alternatively, the wires 60 may be embedded in the inner surface of the housing.

The wires 60 are connected to suitable connections (not shown) in a line jack unit (telephone plug socket) 62 which is fixed adjacent a sidewall 63 of the housing 41. Similarly, the line jack unit 62 is electrically connected in series to a second line jack unit (telephone plug socket) 64 disposed above the line jack unit 62. The side wall 63 of the housing 41 has a pair of apertures 65, 66 through which a respective plug 67, 68 may be inserted into the line jack units 62, 64.

In the example shown, the plug 68 is connected by a cable 71 to a telephone 70 and the plug 67 is connected by a cable 69 to a communications apparatus 72 for example a telephone answering machine, a facsimile machine or a computer. A shown, the cables 69, 71 pass through a respective slot 73, 74 in the side wall 75 of a back plate 76. The back plate 76 is securable to the housing 41 by means of a screw 81 which locates in a bushing 77 in the housing 41. The side wall 75 locates in upper and lower guides 78, 79 which are integrally formed with and extend outwardly from the side wall of the housing.

The back plate 76 further has a slot 80 through which the shank member 44 projects to enable the shank member 44 to be located in the line jack unit shown in FIG. 3.

In use, the plugs 67 and 68 are inserted into the respective line jack units 62, 64 and the back plate is then fixed to the housing 41 by the screw 81 with the cables 69, 71 passing through respective slots 73, 74. The shank member 44 is then inserted into the line jack unit 14 (FIG. 3) which is usually mounted on a wall in a building. Thus, the two line jack units 62, 64 are electrically connected to the telephone line in the unit 14 via the electrical contacts 45 on the shank member 44. When the barrel lock 42 is operated by a key, the latch member 48 is moved outwards to the position shown in FIG. 5a and the latch member engages behind a flange in the line jack unit 14 and thus the apparatus 10 cannot be removed by an unauthorised person.

Figure 6:
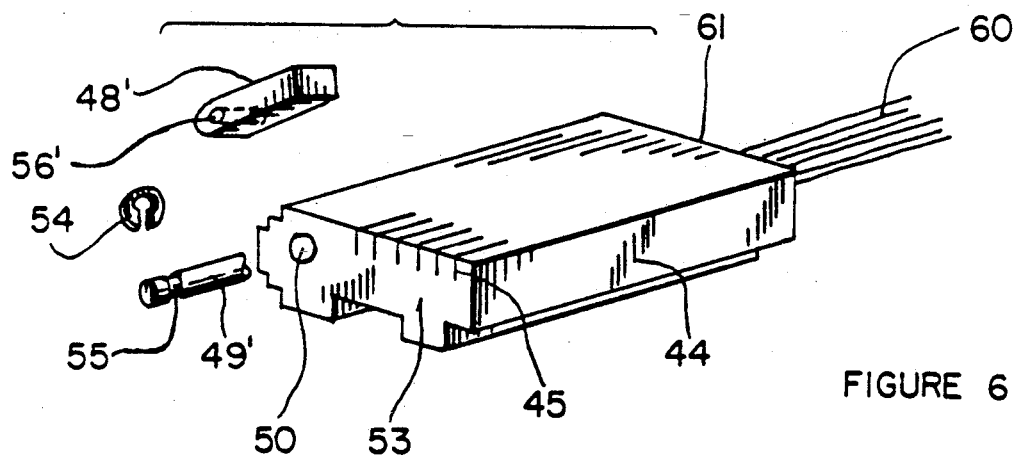
FIG. 6 is a perspective view of another embodiment of the shank member of the apparatus of FIG. 4.

Referring now to FIG. 6 there is shown therein another embodiment of shank member according to the invention. The shank member of FIG. 6 is similar to that of FIGS. 5b except that a latch member 48' is now mounted on a pin 49' adjacent to the end of the shank member. The latch member 48' is fixed to and rotates with the pin 49' when the barrel lock is operated, so that in the locked position the latch member engages behind a flange in the line jack unit 15. As shown, the latch member 48' has an aperture 56' through which the pin 49' projects, the latch member 48' being engaged on the pin 49' between the reduced diameter portion 55 and the end 53 of the shank member.

The invention will have particular use where it is desired to "lock in" a communications apparatus to a particular telephone line and prevent unauthorised use of the telephone line by another telephone or communications apparatus. For example, to gain access to a telephone line some unauthorised users will disconnect a plug which is perhaps connected to a facsimile machine, and then connect a telephone to make a telephone call. The invention overcomes this and other known disadvantages of telephone plug systems.

I claim:

1. A lockable telephone plug apparatus comprising a shank member for insertion into a line jack unit, said shank member having suitable connections for connecting with the electrical connections in the line jack unit, said apparatus further comprising locking means, a pin mounted in the shank member and arranged to be turned by the locking means about the axis of the pin while the shank member remains stationary and a locking part which is carried by the shank member and moves, when the pin is turned appropriately, into a position in which it can engage a part of the line jack unit socket to prevent removal of the telephone plug apparatus from the line jack unit.

2. An apparatus as claimed in claim 1, wherein the shank member and the locking means are fixed in a housing.

3. An apparatus as claimed in claim 2 wherein the housing contains at least one line jack unit, for receiving a plug which is connected to a telephone or other communication apparatus, said at least one line jack unit being electrically connected to the shank member, and means for preventing removal of said plug from the housing.

4. An apparatus as claimed in claim 3, wherein the housing has an aperture through which said plug is inserted and a closure member is attachable to said housing to close said aperture and prevent removal of the plug, said closure member having a slot through which a lead from said plug can pass.

5. An apparatus as claimed in claim 3, wherein said housing contains two telephone line jack units connected to the shank member.

6. An apparatus as claimed in claim 1, wherein the locking part is mounted in a recess in the shank member and moves laterally of the shank member into said position.

7. An apparatus as claimed in claim 1, wherein the pin has an end which projects out of the shank member and is the foremost part of the pin when the shank member is being inserted into the line jack unit and said locking part is fast with said end of the pin.

8. An apparatus as claimed in claim 1, wherein the pin is connected to and rotated by a key operated barrel lock.

* * * * *